United States Patent [19]

Muncheryan

[11] 3,821,510

[45] June 28, 1974

[54] HAND-HELD LASER INSTRUMENTATION DEVICE

[76] Inventor: Hrand M. Muncheryan, 1735 Morningside St., Orange, Calif. 92667

[22] Filed: Feb. 22, 1973

[21] Appl. No.: 334,582

[52] U.S. Cl. .......... 219/121 L, 128/172, 128/303.1, 128/395, 350/96
[51] Int. Cl. ............................................ B23k 27/00
[58] Field of Search ................ 219/121 L, 121 LM; 250/227; 350/96; 128/303.1, 395, 397; 331/94.5 A

[56] References Cited
UNITED STATES PATENTS

| | | | |
|---|---|---|---|
| 1,968,997 | 8/1934 | Drucker | 219/121 L |
| 3,327,712 | 6/1967 | Kaufman et al. | 128/398 |
| 3,382,343 | 5/1968 | Muncheryan | 219/121 L |
| 3,383,441 | 5/1968 | Muncheryan | 219/121 L |
| 3,621,198 | 11/1971 | Herbrich | 219/349 |
| 3,622,743 | 11/1971 | Muncheryan | 219/121 L |

Primary Examiner—J. V. Truhe
Assistant Examiner—Clifford Shaw

[57] ABSTRACT

This invention is a laser-beam transmitting and focusing device provided with means for selectively passing therethrough one or more fluids simultaneously for use during operation thereof in medical surgery, dental restorative manipulations, or materials working in industry. The invention comprises a flexible laser-beam transmitting conduit having at one end thereof a hand-manipulative instrument or stylus containing an adjustable laser-focusing system and a fluid control means to regulate the flow of fluid therethrough during the operation of the device.

28 Claims, 13 Drawing Figures

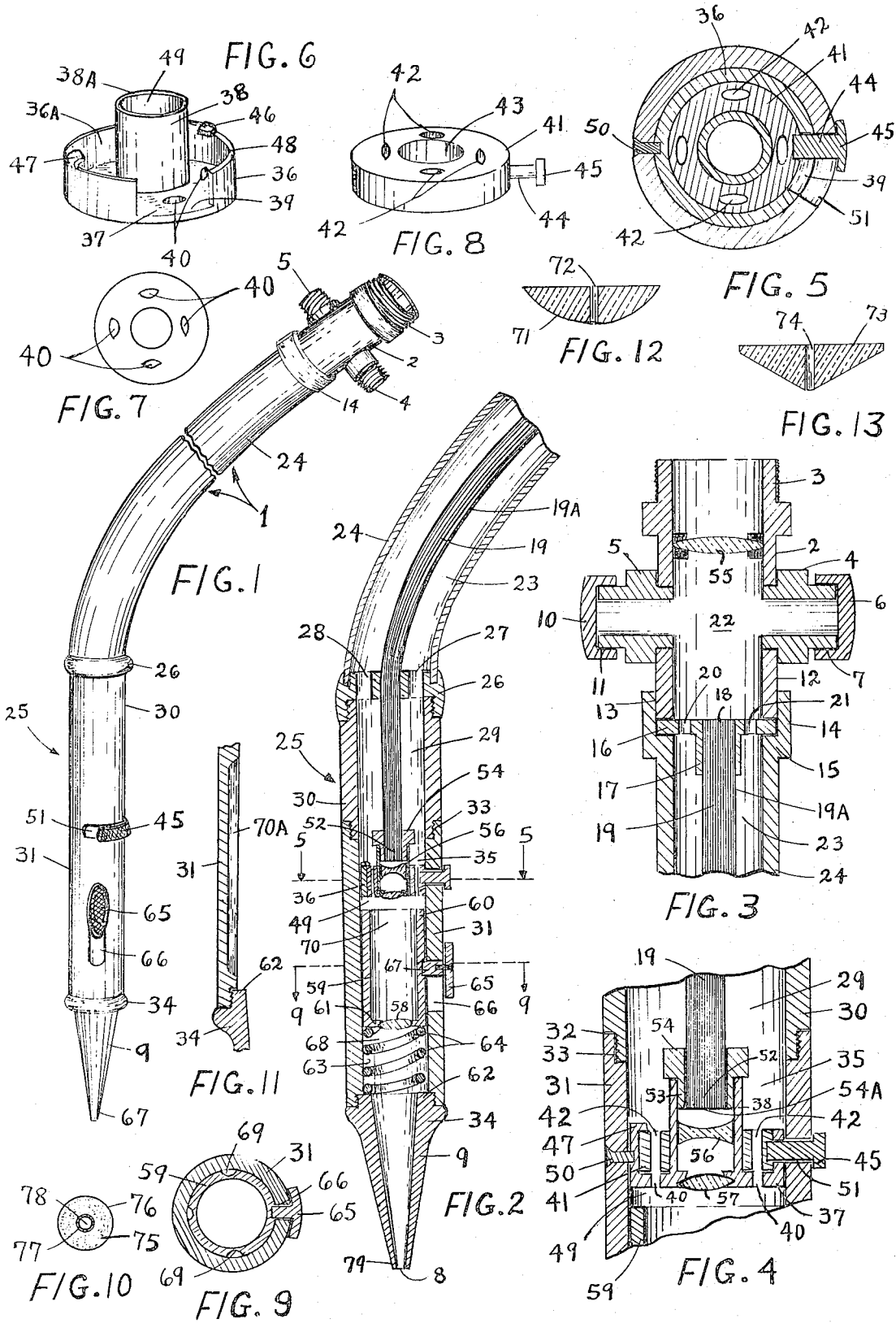

HAND-HELD LASER INSTRUMENTATION DEVICE

BACKGROUND OF THE INVENTION

This invention is related to the flexible laser-beam transmitting and focusing optical system described and claimed in each of the U.S. Pat., Nos. 3,382,343 and. No. 3,383,491, issued to me respectively on May 7, 1968 and May 14, 1968. In these patents, I have disclosed a laser-beam transmitting flexible fiber-optic conduit with an optical system for focusing the laser beam on a workpiece. The lens position in the optical system shown in these patents is fixed so that the plane of the laser beam coincides with the surface of the workpiece in contact with the instrument tip during operation thereof. Since the lens therein is not adjustable, replaceable lenses of different focal lengths must be used to obtain a focal plane at desired locations remote from the tip of the instrument. The fiber-optic bundle does not have a cooling means in case high-power laser radiation of present-day magnitude are to be conducted therethrough. Since the lens position is not adjustable, it is not possible to obtain a defocused laser beam from the instrument when the focal plane of the laser beam is coincident with the surface of the workpiece, as the greatest advantage and efficiency intended in that device is obtained at the point of contact between the workpiece and the instrument tip, the position of the focal plane.

Furthermore, recent interest in application of a laser beam in medical and dental surgery has prompted the necessity of focusing the laser beam beyond the tip of the laser instrumentation stylus so that the instrument tip does not touch any tissue or exudate therefrom to become contaminated thereby during incision and cauterization of the body tissues; the prior art does not permit the implementation of such a requirement. In addition, in medical surgery or dental restorative work, subsequent to the incision of a tissue with the hot focus of the laser beam the surrounding tissues need be kept cool so as to confine the cutting and cauterizing effect of the laser beam to the area under operation. This restraint of the prior art is also of concern in point coagulation of minute tissues such as in histolysis. Also, the laser-beam transmitting conduit fibers in the prior art are susceptible to the solarizing action of a high-power laser beam and energy loss thereby unless provision is made to cool the fibers during operation of the instrument; this provision is lacking in any related prior art.

Attempts have also been made by prior art in which internally reflective conduits, prisms, and mirrors have been used to transmit and focus the laser beam on the workpiece, but they have not been successful because of the large amount of spectral dispersion thereby of the laser beam and their failure to focus the laser beam at a single focal point without aberration, thereby erratic cutting and cauterizing operations have been encountered with these instruments and therefore their use has been curtailed in medical and dental applications. Multiple reflection mirror means or metal reflectors for transmitting the laser beam in jointed pipes have also beem used to implement the laser beam on body tissues and dental work in-vivo, but these attempts have not shown significant success because of the lack of flexibility of use of the instrumentations and because of their time-consuming character in adjusting them with respect to the area of surgical instrumentation and of their costly mechanical structures. Consequently, an essential need has existed for a laser instrumentation device which provides a high flexibility of usage and an easily adjustable and beam manipulative instrument at any distance from the tip exit-port of a hand-manipulated stylus, a defocused laser beam rapidly transformed from a focused beam, and an instrument cooling means as well as a means for cooling the laser-operated body tissues or materials adjacent or surrounding the laser-worked area in industrial applications. It is also necessary at times to rapidly anesthetize locally a subcutaneous body tissue for cauterization with the laser beam. The prior laser-beam instrumentation systems have lacked the provision of such expedients.

SUMMARY OF THE INVENTION

The present invention circumvents the above-stated deficiencies of the laser-instrumentation devices or systems of related prior art. The invention embodies a readily implementable instrumentation system, using as few moving parts as possible at reasonable cost. In the device, an improved laser waveguide has been incorporated whereby solarization and thermal degradation of the optical fibers in the conduit have been eliminated; the heat dissipation from the instrument has been accelerated by the use of a cooling means therein; loss of laser-beam energy due to absorption by the use of conventional fiber optics has been greatly reduced by the application of efficient fiber optic materials of optimum refractive index and method of usage thereof; consideration of polychromatic fibers covering the spectral range from ultraviolet to infrared has also been included; provision has been made to conduct a stream of fluid through the instrumentation device for cooling the device as well as using the fluid on the work during laser instrumentation; in a modified form of the optical fibers, a lasing fiber material has been used to amplify the transmitted laser beam. In addition, the optical fibers have been treated peripherally thereof with a high thermoconductive material by ion plasma diffusion in vacuum, for rapid heat conduction from the optical fibers to maintain their laser-beam transmitting efficiencies.

Provision of a peripheral chamber is also made within the laser-beam transmitting conduit and surrounding the optical waveguide (optical fibers) for the transmission of a fluid therethrough. In the several modified forms of the laser conduit, fluid-filled or polymer-filled optical fibers are also used to reduce or eliminate skewing propagation of the laser radiation and thus to reduce laser absorption losses. A thumb-regulated fluid control means has also been provided on the stylus for regulating the flow and hence the temperature of the fluid through the instrument and upon the work under laser instrumentation; the temperature control is achieved by passing the transient fluid through small openings disposed within the passages of the regulating valve and suddenly expanding the fluid in an adjoining chamber within the stylus, the degree of cooling being inversely proportional to the size of the regulating opening. Accordingly, in order to implement the advantages of the present invention by overcoming the problems and deficiencies of the prior expedients, the invention includes for its objects and advantages the following means of implementation.

The principal object of the invention has been the provision of an easily manipulated laser instrumentation device having the greatest flexibility of use in directing a laser beam through the spatial distance from the external laser source to the workpiece and utilizing the laser energy in any desired direction, attitude, and energy concentration.

A further object of the invention is to provide a flexible laser waveguide material of high resistance to solarization by the laser beam passing therethrough, thus increasing the useful life of the laser waveguide.

Another object of the invention is the provision of a fluid, such as a transient gas through the flexible laser-beam transmitting conduit and in peripheral relation to the laser-beam waveguide to cool the waveguide as well as to cool the tissues contiguous to the area being operated in medical or dental surgery, or the surrounding areas during welding of industrial materials to eliminate heat-affected zones which reduce the strength of the welded structure.

A further object of the invention is the utilization of a lasing fiber optics material for the laser waveguide to compensate for any small transmission losses that may reduce the laser-beam energy by absorption as prevalent in conventional laser waveguides.

A still further object of the invention is to deposit a thin coating of a high thermoconductivity material, such as silver, copper, gold, or aluminum, over the laser fiber-optic bundle or waveguide for rapid radiation of heat therefrom during transmission of a fluid through the hand-held instrument or stylus.

Another object of the invention is the provision of a mixture of polychromatic fibers covering the spectral range from ultraviolet to infrared to provide a wider spectral range of transmission than when a single type fiber is used.

A further object of the invention is the provision of fibers of tubular character with a liquid, gas, or a clear polymer gel included therein for conduction of the laser beam with little or no multiple reflections internally to the waveguide, since multiple reflections degrade the radiation density in transmission; this innovation conserves laser energy transmitted through the device to the point of utilization, as well as increasing the numerical aperture of the fibers to a significant extent.

A still further object of the invention is the provision of a control means disposed in the body of the hand-held instrumentation device or stylus whereby the amount of fluid flow therethrough can be regulated by the operator as the work proceeds; the fluid may be one of several different inert gases, an oxidizing medium, or an anesthetic gas such as methyl chloride for providing local anesthesia in a body area by cooling thereof prior to laser incision or cauterization.

Other objects and advantages of the invention will become more apparent from the following specification taken in conjunction with the accompanying drawings wherein like characters designate corresponding parts throughout the several views of the invention, and wherein:

FIG. 1 is a perspective view of the invention.

FIG. 2 is a schematic sectional view of the invention, showing the internal structure of the hand-held instrumentation device with a partial view of the flexible laser-beam transmitting conduit.

FIG. 3 is a sectional view of the proximal portion of the laser instrumentation conduit, showing the arrangement of three connectors and the terminal portion of the laser waveguide and its manner of attachment to the flexible external sheath.

FIG. 4 is an enlarged view of a portion of the stylus showing the details of the collimating lenses and their relationship to the distal end of the laser waveguide or fiber-optic bundle, and the fluid-regulating valve with apertures therein.

FIG. 5 is a portion of the cross-sectional view of the stylus taken on the line 5 — 5.

FIG. 6 is a perspective view of the annulus forming a part of the fluid-regulating valve.

FIG. 7 is a bottom view of the annulus shown in FIG. 6.

FIG. 8 is a perspective view of the fluid-regulating valve disk that fits into the annulus shown in FIG. 6.

FIG. 9 is a cross-sectional view of the stylus taken on the line 9 — 9.

FIG. 10 is a cross-sectional view of a modified laser waveguide having a central bore with a flexible tubing disposed therethrough.

FIG. 11 is a sectional view of a modified portion of the stylus wall, showing a groove milled out in the wall for passage of fluid therethrough and peripherally to the optical lens holder.

FIG. 12 is a sectional view of a modified form of a focusing lens.

FIG. 13 is a sectional view of another modified form of the focusing lens.

SPECIFICATION OF THE DISCLOSURE

Referring to the drawing, FIG. 1 shows the perspective view of the hand-held laser instrumentation device having a flexible conduit 1 provided at its proximal end 2 with three inlet connectors designated by 3, 4, and 5, each having screwthreads formed externally thereon for connection to externally provided intakes. The connector 3 is adapted for connection to an external source of laser radiation; the connector 4 attaches to a source of pressurized fluid such as an inert gas characterized by neon, helium, argon, nitrogen, or any combination thereof; the connector 4 may also be connected to a source of oxygen as the need is seen by the operator of the device. When not in use, the connector 4 may be capped with a cap 6 by securing it at screwthread attachment 7 (threads not shown for clarity). The connector 5 is attached to a source of gas for medical or dental use, such as methyl chloride, ethyl nitrate, or the like for superficial anesthesia because of its property of exhibiting a high degree of cooling effect by evaporation when sprayed on the superficial tissue from a small exit port 8 provided at the tip 79 of the coniform section 9. The connector 5 may also be capped with a cap member 10 having screwthreads at 11 (not shown in drawing), when not in use.

The portion 12 of the tubing containing the connector 3 and extending beyond the connectors 4 and 5 is attached by screwthreads (not shown) at 13 to the mating threads (not shown) of coupling 14 of the flexible conduit 1. On the internal portion of coupling 14, a shoulder 15 is formed to accommodate a circular flange 16 of a ferrule 17, which is secured to the proximal end 18 of a multichannel laser beam waveguide 19.

The flange 16 is perforated by apertures 20 and 21 to establish communication between chamber 22 and chamber 23; chamber 23 forms a tubular cavity at the periphery of the laser waveguide 19. The coupling 14 constitutes the proximal part of the flexible tubing or sleeve 24 of the flexible conduit 1.

The flexible tubing 24 may be made of a suitable plastic material such as a nylon-braded vinyl tubing, polyethylene tubing, Dow-Corning and medical grade silicon elastomer tubing, or a reinforced rubber tubing. The plastic materials are selected for application in the present invention because they maintain their integrity even with repeated sterilization in the device and they also offer excellent shelf life. Any of these materials will withstand internal pressures up to 1,500 PSI, far above the 20 to 45 PSI pressure requirement for the fluid to be employed within the present device.

The laser waveguide 19 is surrounded by a thin plastic tubing 19A of about 1-mil thickness, which is formed thereon by electrostatic spraying. A thin film of 40 to 70 micron thickness of a thermoconductive material, such as silver, gold, copper, or aluminum, is deposited by diffusion, or electrolytically on top of the 1-mil thick plastic so as to form a highly thermoconductive metallic layer thereon for dissipating by radiation into chamber 23 of any heat that may develop in the laser waveguide 19 during operation thereof. The transient fluid through the chamber 23 readily absorbs the heat and conducts it away from the exit port 8 of the coniform section 9. As stated earlier, the maintenance of the laser waveguide at room temperature or below by cooling the laser waveguide 19 retains the efficiency of the laser beam transmission thereby; or, the laser-radiation emission of a waveguide which is lasing type is optimum. The temperature conditioning is accomplished by passing the fluid peripherally to the waveguide. Depending on the type of operation to be performed by the instrument, the fluid temperature may be kept at room temperature for most operations, or above room temperature by external heating prior to transmission through the instrument, such as for metallic materials-working at low-temperature atmospheric conditions when the waveguide has the tendency to become "rigidized." In dental work, as well as in medical surgery, the fluid introduced into the instrument preferably should be at room temperature or cooler; the room temperature is considered to be between 68° to 75°F in these discussions.

Solid fibers that satisfactorily operate in the present system comprise a neodymium-doped glass, germanium, germanate glass lanthanate glass, fused quartz coated with lower refractive-index magnesium fluoride, lead glass, and certain plastic materials such as polyacrylonitrile fiber, copolymer fiber, polystyrene fiber, and the like. Tubular fibers of polystyrene and fused quartz filled with a high refractive index fluid were also used because of their low internal reflection properties, to be discussed in a later section.

The distal end of the flexible conduit 1 is provided with a laser instrumentation device or stylus 25 attached to the flexible conduit 1 with an annular coupling 26, which is provided therein with apertures 27 and 28 for the passage of a fluid from chamber 23 into chamber 29 formed within the tubular section 30 of stylus 25. A second tubular section 31 is joined to the tubular section 30 as at 32 (FIG. 4) by screwthreads 33 and terminates at a coniform member 9 (FIG. 2) by attaching thereto at section 34. The tubular section 31 is provided internally thereof with a chamber 35 (FIG. 4) continuous with chamber 29 of tubular section 30. An annular member 36 having one end closed by a base section 37 containing a tubular projection 38 formed centrally thereof is disposed in chamber 35 of tubular section 31. The annular member 36 has a cut-out section 39 (FIG. 5) in the wall thereof. The base 37 is perforated with a plurality of small apertures 40. A circular disk 41 having apertures 42 to coincide with the corresponding apertures 40 disposed in the base section 37 is provided with a large central aperture 43 and a side projection 44 having a pushbutton 45. The disk 41 is disposed within the cavity 36A of the annular member 36 so that the tubular projection 38 passes through the aperture 43 of disk 41, with the side projection 44 accommodated in the cut-out section 39 of the annular member 36. Lugs 46 and 47 are formed at the rim 48 of the annular member 36 for retaining the disk 41 rotatably within the cavity 36A of the annular member 36; thus the entire assembly comprising the annular member 36 together with the disk 41 constitute an adjustable valve, such as a fluid-flow regulator, so that when the disk 41 is rotated by means of the side-projection pushbutton 45 for registering the apertures 42 with apertures 40, a passage therethrough is formed for a fluid flow. When the disk 41 is rotated using the pushbutton 45 in the opposite direction, the apertures 40 are covered by the solid area of disk 41, shutting off the passage therein. Consequently, this valve mechanism is used in controlling the amount of fluid flow from chamber 29 into chamber 49 disposed within the tubular section 31.

A setscrew 50 is inserted through the wall of the tubular section 31 (FIGS. 4 and 5) into the wall of the annular member 36 to hold said member stationary within the tubular section 31. Diametrically opposite to setscrew 50, a radial slot 51 is formed in the wall of the tubular section 31, and the side projection 44 of disk 41 is disposed therein. As the side projection 44 is moved radially by means of pushbutton 45, the respective apertures 42 in the disk 41 and apertures 40 in the base 37 of the annular member 36 become gradually in register; this action gradually increases the size of the passage formed by the respective apertures, and thereby any transient fluid from chamber 35 into chamber 49 (FIG. 4) increases to a maximum in amount when the widest opening of the registered apertures is achieved. As the pushbutton or thumb-button 45 is rotated in the opposite direction the quantity of fluid passing into chamber 49 decreases until it is shut off when the pushbutton 45 is rotated back to its original or closed position.

The distal end 52 (FIG. 4) of the laser waveguide 19 is provided, for the support thereof, with a ferrule 53 having an outwardly projecting flange 54, which is seated over the free rim 38A of the tubular projection 38 to be supported thereon. The cross-sectional surface 54A of the distal end 52 of the fiber-optic waveguide 19 is highly polished and, when the laser waveguide 19 is made of a lasing material, a thin coating of laser-transparent multilayer dielectric is deposited thereon to form a partial mirror. The partial mirror acts as a reflector of a stimulated laser radiation in the laser waveguide 19, forming a Fabri-Perot resonant cavity together with the reflector in the external source of a laser beam that enters the flexible conduit 1 through the condenser lens 55 disposed in the connector 3. The laser beam emerging from the surface 54A of the laser waveguide 19 projects on a biconcave lens 56 positioned adjacent thereto. The biconcave lens 56 and the biconvex lens 57 form together a laser-beam-collimating optical system, so that the laser beam emergent from the lens 57 is a parallel beam prior to its incidence upon the focusing lens 58 (FIG. 2) disposed in the lens holder 59. The converging lens 58 concentrates the laser beam received thereby to a focus adjacent the exit port of the coniform section 9 at the initial and normal position of the lens 58 as shown in FIG. 2; this position of lens 58 will be referred to as normal position hereinafter.

The tubular lens holder 59 has one end 60 thereof open and the opposite end closed by an internally projecting flange 61 retaining the lens 58. The end section 34 of the coniform section 9 has an inwardly projecting portion 62, and together with the internally projecting flange 61 of lens holder 59 an annular recess 63 is formed within the tubular section 31. A spring member 64 is disposed within said recess to bias the lens holder 59 with the lens 58 therein and to sustain it in the normal position shown in FIG. 2. The pushbutton 65, disposed in an axial slot 66 formed in the wall of the tubular section 31, limits the displacement of lens holder 59 to the axial length of the slot 66 shown in FIG. 2, since the pushbutton 65 is attached to lens holder 59 at point 67. The pushbutton 65, manipulated by a thumb, moves the lens holder 59 with the lens 58 downward to project the focal plane of the laser beam further away from the exit port 8; thus the focal plane of the lens 58 can be displaced from the exit port 8 a distance equal to the displacement of the pushbutton 65 within the axial slot 66. The displacement of the focal plane to any distance remote from the tip 79 of the coniform section 9 permits a clean-cut operation of the laser beam upon a given workpiece, such as the body tissues in surgical operation using the laser beam; this condition further prevents any contamination of the stylus tip 79 by exudates in surgery.

In operation, a fluid medium being transmitted from chamber 35 through the respective apertures 42 and 40 of the disk 41 and base member 37 into the chamber 49 passes into chamber 68 through grooves 69 (FIG. 9) formed on the external periphery of the lens holder 59. In place of the grooves 69, apertures may be provided in the flange 61 in the periphery of lens 58, whereby the incoming fluid from chamber 49 passes through the lens holder chamber 70 into chamber 68 and out through the exit port 8. Or, several grooves such as 70A (FIG. 11) may be milled out in the internal surface of the tubular section 31 located in the peripheral relation of lens holder 59, as shown in the fractional view in FIG. 11. In any case, a continuous communication is thus provided between the chamber 49 and chamber 68 at all times; the fluid then passes from chamber 68 through exit port 8 and is ejected upon the work area.

Since the maximum degree of thermal stress created by a laser beam incident on a focusing lens is concentrated in the center of the lens body by internal reflections of the beam, a modified lens 71 configuration with a central aperture 72 formed therein is also employed in the present laser instrumentation device for applications using high-power laser beams in the order of $3 \times 10^9$ watts peak power, such as for cutting and drilling relatively thick metallic materials and teeth enamels in restorative dentistry. The lens 71 has an aplanatic, aspherical surface which permits the obtaining of a perfect focus without aberration or coma in a focal field as small as 30-micron diameter circle at the above-stated peak power. The aperture 72 in lens 71 eliminates the centrally directed thermal stress concentrations and therefore prevents the lens from cracking or destruction by the high-energy laser radiation. The configuration of lens 58 can be used generally with most standard medical and dental soft-tissue applications, including welding and cutting of circuit components in miniature microelectronic devices and in dental prosthesis, such as for bridgework repairing.

Another focusing lens configuration is also used in the present instrumentation device; for instance, the focusing lens 73 shown in FIG. 13. The lens 73 is a planoconical lens (axicon) provided with a central aperture 74 for the same reason as described for lens 71. The focus of the lens 73 takes the form of a tubular spot, that is, a ring focus is formed on the workpiece when the incident laser radiation has been first collimated by means of lenses 56 and 57. For welding and drilling certain thin-film passive areas in microelectronic circuit devices such a ring focus would be advantageous because of the weld structure formed thereby would be annular, leaving the center and the periphery of the annulus thus formed free of heat-affected zone, which effect would be detrimental to the weld structure and quality. Furthermore, in drilling thin-wall materials, a clean-cut and sharp-edged hole wall is obtained, thus achieving an optimum quality hole configuration. In dental work, the use of an axicon lens with a central hole therein will facilitate drilling holes in the teeth by simultaneously removing the debris therefrom by a jet of sterilized gas or liquid directed centrally to the laser beam incident on the area of the dental cavity. Accordingly, instead of replacing a lens in the lens holder 59 from one type to another for different applications, the entire lens holder with the lens is replaced in the present laser instrumentation device. Different lens holders having different lenses are provided as ancillary spares with the present device, the differences in lenses comprising the provision of different focal lengths and different lens comfigurations. Other lens configurations can also be used in the present instrumentation device, such as planoconvex and planoconcave lenses with or without central holes; they serve respectively the same purposes as the biconvex and biconcave lenses shown hereinbefore.

One of the unique characteristics of the laser-beam transmitting conduit employed in the present invention is the use of tubular fibers filled with a suitable, optically transparent fluid or polymer gel to conduct the laser radiation with minimal loss due to internal reflections as occur when conventional solid fibers are employed, as the laser radiation-conducting material. Several of the straight-chain alkene derivatives were used successfully in this operation. For instance, the polyhalogenated compounds, such as ethinyl trichloride and perchloroethylene, or cyclic alkanes such as cyclohexane, displayed high laser transmission characteristics with very low luminal loss. As an example, the luminal loss varied from 0.02 to 0.03 decibel per three feet of the waveguide used, depending on the type of filling and the laser-beam wavelength used. One other material that was used with satisfactory application in the present invention was a clear polyvinyl chloride liquid. This compound was mixed with a curing agent and subjected to a vacuum atmosphere to remove all bubbles, and subsequently introduced into a tubular fiber. The substance polymerizes into a gel at room temperature within the tubular fiber, which is then cut into desired length. Several of these strands are bundled together with a suitable cement to form the final optical conduit.

In FIG. 10, a modified fiber-optic bundle is shown comprising the fibers 75 enclosed in an external sheath 76 of a thin-walled polystyrene medical-grade tubing. The fibers are arranged peripherally to a tubular member 77 of polystyrene or a medical-grade silicon elastomer. When this type of optical conduit is employed in the present invention, the sheath or sleeve 24 can be made close-fitting to the optical conduit or waveguide, thus dispensing with the apertures 27 and 28, since the transient fluid through the instrument can then be transmitted through the bore 78 of the optical conduit when modified, the fluid also serving to cool the optical waveguide during its passage therethrough.

For effective operation of the present laser instrumentation device in different applications, it would be advantageous and preferable to know and to use the most effective laser beam for the particular type of work in hand. For instance, it was found in practice that a laser beam from a laser generator employing carbon dioxide or neodymium-YAG (both in infrared spectrum) is more effective for medical applications in general than other types of lasing elements; laser radiation from argon plasma was more efficient in being absorbed by the retina and therefore its use in photocoagulation is recommended. Laser beams for neodymium-YAG, pulsed ruby, and carbon dioxide are preferable for industrial work, such as welding, cutting, scribing, and drilling; carbon dioxide laser displayed highest efficiency in heavy-duty metal welding and cutting. Carbon dioxide and neodymium-YAG emit continuous laser radiation and are most effective for in-vivo laser instrumentation in restorative dental work. The laser waveguides described hereinbefore displayed high compatibility with the laser radiations from carbon dioxide, neodymium-YAG, ruby, heliumneon, nitrogen, argon, and liquid lasing organic dyes; the choice of the waveguide used during fabrication of the present instrumentation device will depend on the requirements of the selected technique of application to be employed in laser instrumentation.

I claim:

1. A hand-held laser instrumentation device capable of conducting therethrough a laser beam emanating from an external source of laser radiation to a work area in medical, dental, and industrial applications, said device comprising: a flexible conduit having an axial bore extending therethrough and including therein a laser-beam waveguide projecting centrally to said bore, a chamber formed at the periphery of said laser-beam waveguide within said flexible conduit, which being provided at one end thereof with a first means for connection to an external source of laser radiation for receiving therefrom a laser beam and projecting it to said laser-beam waveguide, a second means located in adjacent relation to said first means and adapted to be connected to a pressurized external fluid source for conduction therefrom a fluid into said chamber for cooling said laser-beam waveguide therein, and a third means positioned diametrically opposite to said second means and adapted for connection to an external source of pressurized anesthetic fluid for conduction thereof into the chamber in said flexible conduit, for medical and dental applications; the opposite end of said flexible conduit being provided with a hand-manipulative tubular stylus having therein a central bore continuous with said chamber at the periphery of said laser-beam waveguide and terminating in an axially disposed exit port at the tip thereof, the distal end of said laser-beam waveguide being disposed within said tubular stylus for connection thereto; a fluid-flow control means including a tubular projection formed centrally thereof being disposed within said tubular stylus with the distal end of said laser-beam waveguide extending into said tubular projection and supported thereby; means comprising a plurality of optical elements to form a laser-beam collimating system disposed within said tubular projection, integrally therewith, adjacent the distal end of said laser-beam waveguide to receive therefrom a laser beam and to collimate said laser beam, and means for focusing a laser beam adjustably positioned adjacent to said laser-beam collimating system to receive a collimated laser beam therefrom and to concentrate said collimated laser beam through said exit port upon a workpiece disposed adjacent thereto; said fluid-flow control means being adapted to receive from the chamber of said flexible conduit a pressurized fluid for ejection thereof through the central bore and the exit port of said tubular stylus upon the work area.

2. A hand-held laser instrumentation device as defined in claim 1, wherein said first means for connection to an external source of laser radiation is a coupling connected to one end of the flexible conduit and is provided therein and transversely thereof with a means for condensing a laser beam hermetically sealed therein to prevent therethrough any passage of fluid into or out of said flexible conduit.

3. A hand-held laser instrumentation device as defined in claim 1, wherein said second means adapted to be connected to a pressurized external fluid source for conducting a fluid therefrom into said chamber for cooling said laser-beam waveguide is a coupling having a cap member for hermetic closure thereof when said laser-beam waveguide is to conduct a low-energy laser beam and thereby requiring no cooling.

4. A hand-held laser instrumentation device as defined in claim 1, wherein said third means adapted for connection to an external source of pressurized anesthetic fluid is a coupling having a cap member for hermetic closure thereof when said anesthetic fluid is not employed through said laser instrumentation device, as for industrial materials working.

5. A hand-held laser instrumentation device as defined in claim 1, wherein said fluid control means disposed within said tubular stylus is an adjustable fluid-flow regulator comprising an annulus secured to the wall of said tubular stylus and supported thereby, said annulus having a base section with a plurality of small apertures formed therein and a tubular projection centrally disposed thereof, a circular disk having therein a centrally positioned large opening and a plurality of small apertures corresponding to the location and size of said apertures formed in the base section of said annulus is rotatably disposed in said base section of said annulus with said tubular projection thereof passing through the centrally positioned large opening disposed in said circular disk, thereby when the corresponding small apertures of said circular disk and those in the base section of said annulus are in register a plurality of continuous passages are formed therethrough, and when said circular disk is rotated so as to cover the small apertures in said base section by means of the solid areas between said apertures located in said circular disk said passages are closed, the assembly thereby forming a fluid control means therein.

6. A hand-held laser instrumentation device as defined in claim 5, wherein said tubular projection centrally disposed in the base section of said annulus includes therein said laser-beam collimating system which comprises optical lenses integrally formed at one end thereof adjacent to said base section, the principal optical planes of said lenses being in perpendicular relation to the axis of said tubular projection.

7. A hand-held laser instrumentation device as defined in claim 6, wherein said optical lenses included in said tubular projection, integrally thereof, comprises a plurality of concave and convex lenses.

8. A hand-held laser instrumentation device as defined in claim 1, wherein said tubular stylus is provided with a slot in the wall thereof and extending axially thereof, and wherein said means for focusing a laser beam is positioned within said tubular stylus adjacent said slot and comprises an adjustable cylindrical member having an internally projecting flange at one end thereof with a lens disposed therein and supported by said flange, and a thumb button with an extension therefrom passing through said slot is attached at said extension thereof to the wall of said cylindrical member for thumb manipulation thereof by said thumb button externally of said tubular stylus.

9. A hand-held laser instrumentation device as defined in claim 8, wherein said adjustable cylindrical member disposed in said tubular stylus is provided with axial grooves on the external periphery thereof for passage of a fluid therethrough during operation of said tubular stylus.

10. A hand-held laser instrumentation device as defined in claim 1, wherein said tubular stylus connected at one end thereof to said flexible conduit is provided at the opposite end thereof with a coniform section, an annular recess is formed in said tubular stylus adjacent the base portion of said coniform section and a spring member is disposed within said annular recess, and wherein said means for focusing a laser beam adjustably positioned within said tubular stylus is biased by said spring member, thereby permitting the movement of said means for focusing a laser beam to and from said base portion of said coniform section, for defining the position of the focal plane of said laser-beam focusing means in spaced relation to the tip of said coniform section.

11. A hand-held laser instrumentation device as described in claim 1, wherein said means for focusing a laser beam adjustably position within said tubular stylus comprises a tubular member with a lens disposed at one end thereof, an axial slot formed in the wall of said tubular stylus in adjacent relation to said means for focusing a laser beams, and a thumb button having an extension passing through said slot is secured to the wall of said tubular member for adjustment of said lens in the axial relation to said tubular stylus, said lens in said tubular member being aplanatic and aspherical type having centrally thereof an aperture to eliminate any stress concentration resultant from a high-power leaser-beam energy incident on said lens during operation thereof.

12. A hand-held laser instrumentation device as described in claim 11, wherein said lens is an axicon with an aperture disposed centrally thereof and is capable of producing an annular focus when a collimated laser beam is perpendicularly incident thereupon at the flat surface thereof.

13. A hand-held laser instrumentation device as defined in claim 1, wherein said laser-beam waveguide comprises tubular fibers filled with a clear laser-transmitting material of high refractive index and low beam-energy transmission loss.

14. A hand-held laser instrumentation device as described in claim 1, wherein said laser-beam waveguide comprises a mixture of polychromatic fibers capable of conducting laser radiations and being compatible with wavelengths of a spectral range from short-wave ultraviolet through long-wave infrared radiations.

15. A hand-held laser instrumentation device as described in claim 1, wherein said laser-beam waveguide comprises tubular fibers filled with a cyclic alkane therein.

16. A hand-held laser instrumentation device as defined in claim 1, wherein said laser-beam waveguide comprises a tubular fiber filled with a liquid polyvinyl chloride mixed with a curing agent and cured to a transparent gel within the tubular fiber subsequent to introduction thereinto.

17. A hand-held laser instrumentation device as defined in claim 1, wherein said laser-beam waveguide disposed within the chamber of said flexible conduit is a multichannel laser-beam transmitting conduit coated at the external surface thereof with a film of thermo-conductive material for dissipating heat from said laser-beam transmitting conduit to maintain the transmission efficiency thereof in operation.

18. A hand-held laser instrumentation device as defined in claim 1, wherein said tubular stylus is provided, in the wall thereof, with a circumferential slot and an axial slot, and a thumb-manipulative button disposed in each of the slots; and, wherein said fluid-flow control means regulates the fluid flow through said tubular stylus and said means for focusing a laser beam is spring biased for axial movement thereof within said tubular stylus; the thumb manipulative button in said circumferential slot is connected to said fluidflow control means for rotation thereof with respect to to said tubular stylus, and the thumb manipulative button in said axial slot is connected to said means for focusing a laser beam to axially manipulate the laser-beam focus for positioning said focus in remote relation to the tip of said tubular stylus.

19. A hand-held laser instrumentation device as defined in claim 1, wherein said laser-beam waveguide comprises a bundle of quartz fibers inclosed in a medical grade plastic sheath, said bundle of quartz fibers having therein a central bore with a tubular member disposed in said bore and in contact with said bundle of quartz fibers; said tubular member being in contacting relation with a transient fluid passing through the flexible conduit during operation of said laser-beam waveguide.

20. A hand-held laser instrumentation device as defined in claim 1, wherein said laser-beam waveguide comprises a bundle of quartz fibers, which being tubular and containing an optically transparent polymer gel of high refractive index for conducting therethrough a laser beam with minimum of laser-energy loss through the walls of said quartz fibers forming the laser-beam waveguide.

21. A hand-held laser instrumentation device as described in claim 1, wherein said laser-beam waveguide comprises tubular fibers of fused quartz filled with a chemical compound consisting of one of the polyhalogenated alkene group characterized by ethinyl trichloride and perchloroethylene.

22. A hand-held laser instrumentation device as described in claim 1, wherein said laser-beam waveguide consists of fibers of one of the neodymium-doped lasing glasses characterized by germanate glass, lanthanate glass, and lead glass, which possess high laser-beam conduction efficiency therethrough and minimum of laser-energy loss characteristics from the fibers.

23. A hand-held laser instrumentation device as described in claim 1, wherein said tubular stylus capable of conducting therethrough a laser beam and a fluid medium is provided on the external wall thereof with a circumferentially movable thumb button and an axially movable pushbutton, respectively connected through the wall of said tubular stylus to the fluid-flow control means and to the means for focusing a laser beam; said fluid-flow control means having a plurality of small apertures disposed about the axis thereof and said radially movable thumb button being adapted with means to open and close said apertures by rotational movement thereof, thereby regulating the amount and thereby the temperature of a fluid passing therethrough; and, said axially movable pushbutton being adapted with means to move said means for focusing a laser beam axially within said tubular stylus for defining the position of the focal plane of the laser beam relative to the tip of said tubular stylus.

24. A hand-held laser instrumentation device as defined in claim 1, wherein said flexible conduit is a medical grade tubing made of a plastic material of a grade capable of withstanding repeated sterilization and pressures up to 1,500 PSI.

25. A hand-held laser instrumentation device as defined in claim 1, wherein said laser-beam waveguide disposed within said flexible conduit extending into said tubular stylus is provided on the periphery thereof with a thin film of plastic material coated with a highly thermoconductive material consisting of one of the heat-conductive metals characterized by silver, gold, copper, and aluminum, for rapid conduction of heat from said laser-beam waveguide and dissipation of said heat into the medium surrounding said laser-beam waveguide.

26. A hand-held laser instrumentation device as defined in claim 1, wherein said flexible conduit provided at the distal end thereof with a tubular stylus has a connection therebetween to attach said tubular stylus to said flexible conduit and at the proximal end thereof said flexible conduit is provided with a plurality of inlet couplings, certain of which are capped when not in use; said connection being provided axially thereof with a plurality of apertures for passage of a fluid from the chamber of said flexible conduit into said tubular stylus.

27. A hand-held laser instrumentation device as defined in claim 1, wherein a wall portion of said tubular stylus that is adjacent to said means for focusing a laser beam and is in abutment therewith is provided therein with axially formed grooves disposed in peripheral relation to said means for focusing a laser beam, for passage of a fluid through said grooves during operation of said tubular stylus.

28. A hand-held laser instrumentation device as defined in claim 1, wherein said laser-beam waveguide comprises a bundle of lasing fibers, the distal end surface thereof being highly polished and coated with a multilayer dielectric to form a partially reflective surface thereon.

* * * * *